(12) United States Patent
Kao

(10) Patent No.: US 12,157,284 B2
(45) Date of Patent: Dec. 3, 2024

(54) SHOE UPPER MANUFACTURING METHOD

(71) Applicant: ZHONG QIANG YI TECHNOLOGY CO., LTD., Taichung (TW)

(72) Inventor: Tzu-Chiang Kao, Taichung (TW)

(73) Assignee: Zhong Qiang Yi Technology Co., Ltd., Taichung (TW)

( * ) Notice: Subject to any disclaimer, the term of this patent is extended or adjusted under 35 U.S.C. 154(b) by 189 days.

(21) Appl. No.: 18/057,879

(22) Filed: Nov. 22, 2022

(65) Prior Publication Data

US 2024/0165903 A1 May 23, 2024

(51) Int. Cl.
*B29C 51/10* (2006.01)
*A43B 23/04* (2006.01)
*A43D 95/14* (2006.01)
*A43D 117/00* (2006.01)
*B29C 51/42* (2006.01)
*B29D 35/14* (2010.01)

(52) U.S. Cl.
CPC .......... *B29D 35/146* (2013.01); *A43B 23/042* (2013.01); *A43D 95/14* (2013.01); *A43D 117/00* (2013.01)

(58) Field of Classification Search
CPC .... A43B 9/00; A43B 5/00; A43B 1/14; A43B 23/026; A43B 23/042; C08L 23/00; C08L 23/12
See application file for complete search history.

(56) References Cited

U.S. PATENT DOCUMENTS

2021/0267317 A1* 9/2021 Kao ............... B29D 35/146

* cited by examiner

*Primary Examiner* — Alison L Hindenlang
*Assistant Examiner* — Debjani Roy
(74) *Attorney, Agent, or Firm* — Rosenberg, Klein & Lee

(57) ABSTRACT

A shoe upper manufacturing method is provided. The shoe upper manufacturing method includes the steps of obtaining materials for shoe uppers, forming the shoe uppers, processing the shoe uppers, and printing the shoe uppers carried out in turn. Thus a multi-layer composite footwear fabric is produced and further processed to form shoe uppers required. Thereby different heating temperature and time are set for heat melting and adhesion of thermoplastic elastomer onto footwear fabric made from different materials in order to meet different requirements of users. Moreover, production efficiency is improved and production capacity is increased by combination of one upper mold with a plurality of lower molds. The present method is more efficient than those in current use.

8 Claims, 4 Drawing Sheets

SHOE UPPER MANUFACTURING METHOD

BACKGROUND OF THE INVENTION

Field of the Invention

The present invention relates to a shoe upper manufacturing method, especially to a shoe upper manufacturing method in which different heating temperature and time are set for heat melting and adhesion of thermoplastic elastomer onto footwear fabric made from different materials. Moreover, production efficiency is improved and production capacity is increased. The method is more convenient and efficient than those in current use.

Description of Related Art

In modern footwear industry, a shoe is made of a plurality of components including the upper, the sole, the heel, the sock, the last, accessories, etc., which are manufactured by different departments or production lines respectively and the shoe is made through processes including preparing materials, pattern making, cutting, sewing, molding, sole attaching, lasting, inspecting, and packaging in turn.

The conventional footwear industry features on intensive labors, many kinds of raw materials used, and complicated manufacturing processes. Especially the manufacturing of shoe uppers, manufacturers should check material toughness, whether the connection is firm or not, whether the use of adhesives is correct or not, and whether the reinforcement is used to strength certain area. Then the shoe upper is produced after internal material (lining) and reinforcement being properly mated to each other and the sewing process. There is an old saying in the footwear industry that shoe making is much more difficult compared with clothing, not only due to higher requirements for product quality, but also difficulties encountered during the manufacturing processes. Although artificial intelligence has been applied to a part of the production lines, it's not applicable to the whole production lines. At present, the footwear industry still largely replies on manual operation in most of processes.

Thus there is room for improvement and there is need to provide a novel shoe upper manufacturing method.

SUMMARY OF THE INVENTION

Therefore, it is a primary object of the present invention to provide a shoe upper manufacturing method in which different heating temperature and time are set for heat melting and adhesion of thermoplastic elastomer onto footwear fabric made from different materials in order to meet different requirements of users. Moreover, production efficiency is improved and production capacity is increased by combination of one upper mold with a plurality of lower molds. Furthermore, the present method not only improves the production efficiency and the production capacity, but also features on reduced labor cost, reduced number of processes, and easy operation while in use. Thereby various types of shoe uppers for different purposes and occasions are produced and more convenient to use.

In order to achieve the above object, a shoe upper manufacturing method according to the present invention includes the steps of obtaining materials for shoe uppers, forming the shoe uppers, processing the shoe uppers, and printing the shoe uppers operated in turn. Thus a multi-layer composite footwear fabric is produced and further processed to form shoe uppers required.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, purposes and functions of the present invention more clearly and completely, please refer to the following detailed descriptions, figures and reference signs.

Figure 1:
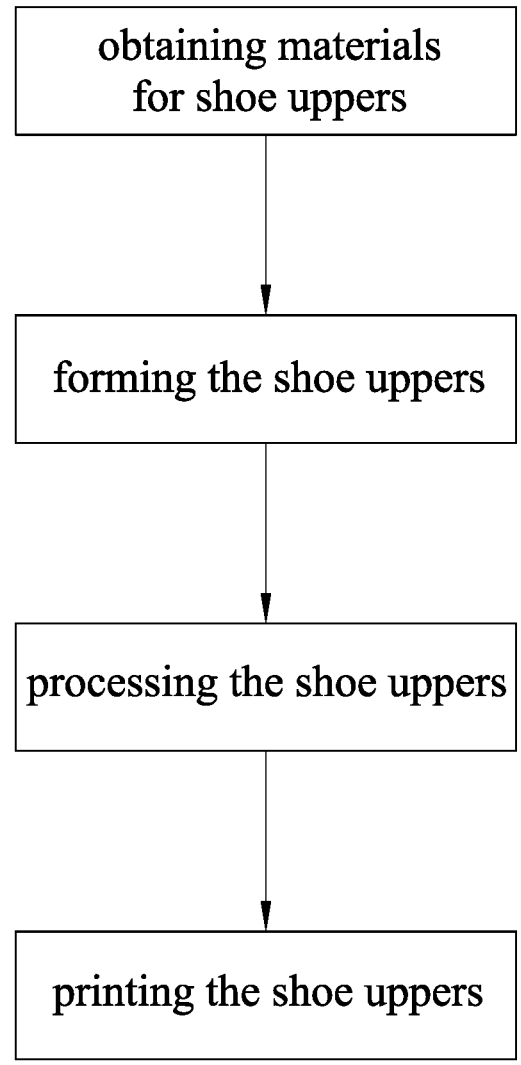
FIG. 1 is a flow chart showing a manufacturing process of an embodiment according to the present invention.

Refer to FIG. 1, a shoe upper manufacturing method according to the present invention mainly includes the following steps.

Figure 2:
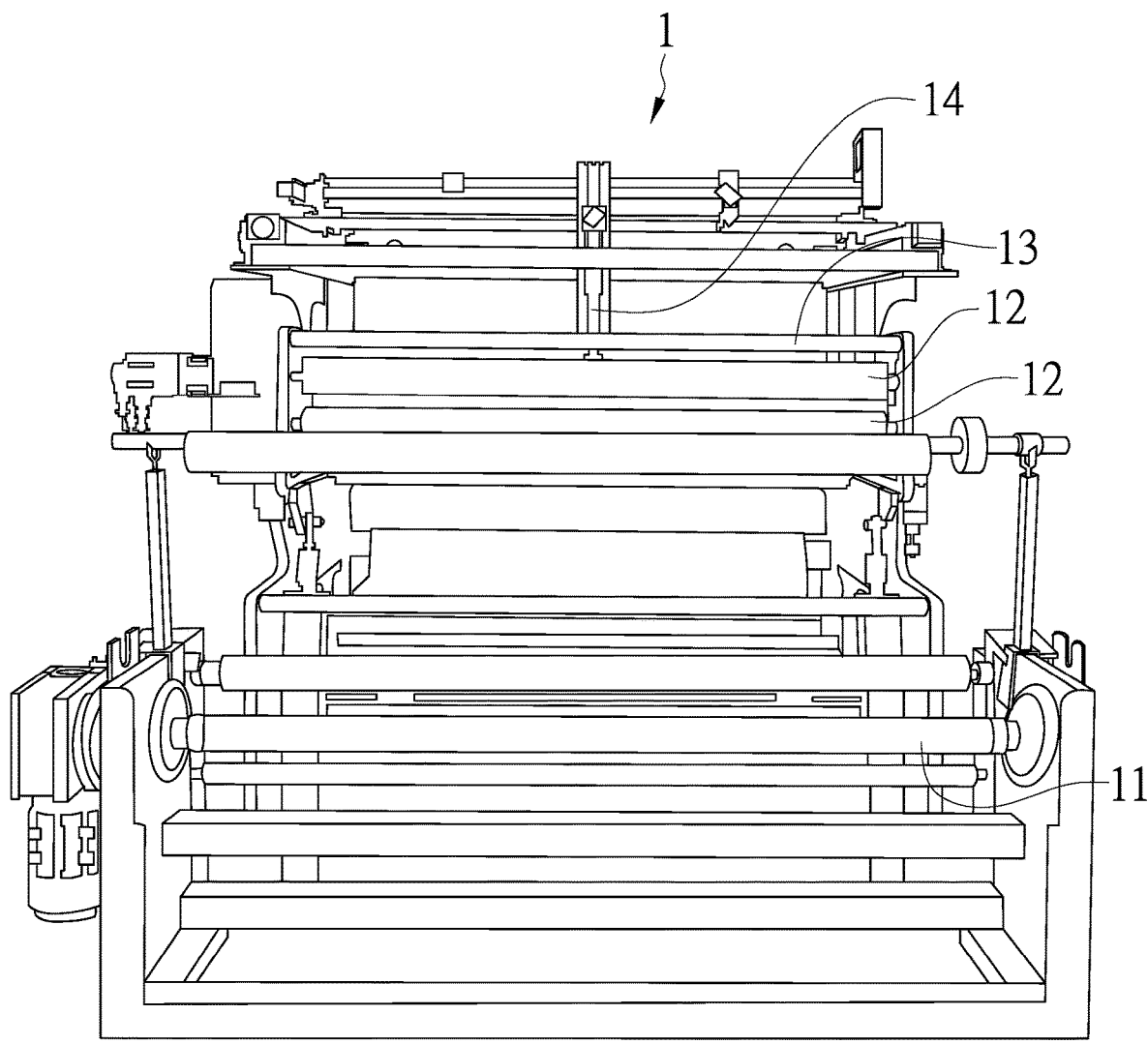
FIG. 2 is a schematic drawing showing a laser cutting machine of an embodiment according to the present invention.

A. obtaining materials for shoe uppers: refer to FIG. 2, turn on a laser cutting machine 1 which includes a material roller 11, a material conveyor 12, a laser cutting platform 13, and a laser head 14. The material roller 11 is inserted into a roll of footwear fabric and thermoplastic elastomer (TPE). The footwear fabric can be canvas, leather, breathable mesh fabric, reflective fabric, or their combinations. Then the material conveyor 12 is disposed over the material roller 11 for delivery of the footwear fabric and the thermoplastic elastomer to the laser cutting platform 13. At least one graphic file with designed upper patterns is input into a control computer of the laser cutting machine 1 so that the laser head 14 of the laser cutting machine 1 cut through an inner diameter and an outer diameter of the footwear fabric and the thermoplastic elastomer. The footwear fabric and the thermoplastic elastomer being cut are sent to a finished product area by a conveyor belt while residual waste material is delivered to a garbage area by another conveyor belt. Thereby the time for manual operation is significantly reduced and production capacity is raised.

Figure 3:
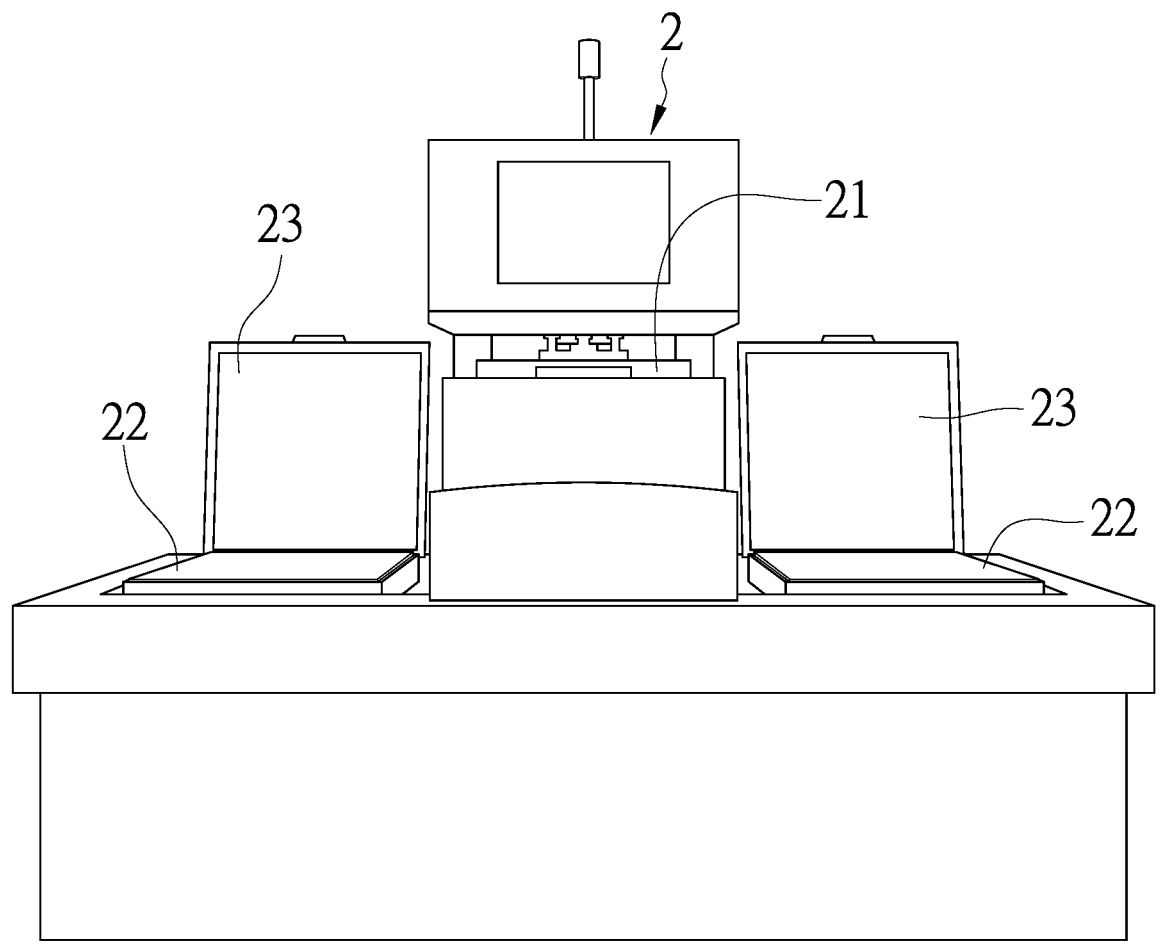
FIG. 3 is a schematic drawing showing of a shoe upper molding machine of an embodiment according to the present invention.

B. forming the shoe uppers: activate a shoe upper forming machine 2 which is a machine which performs microporous low-temperature sintering and vacuum heat transfer printing, as shown in refer FIG. 3. The shoe upper forming machine 2 consists of one upper mold 21 and a plurality of lower molds 22. A shoe upper template is placed on the lower mold 22 and able to be replaced by other shoe upper templates with different upper patterns. In order to meet functional needs of users, at least one of the footwear fabric including canvas, leather, breathable mesh fabric, reflective fabric, etc. and the thermoplastic elastomer are hot melt and adhered to each other to form an integrated multi-layer composite footwear fabric 3. The multi-layer composite footwear fabric 3 for different purposes has different material properties so that the temperature and time required for melting and adhesion are different. The heating temperature and time of the upper mold 21 and those of the lower mold 22 are set respectively according to combinations of the materials used. During the heating process, heat of the lower mold 22 is transferred to the shoe upper template. Turn on an air compressor and use a thermometer to check whether the temperature of the lower mold 22 has reached the set temperature. After confirming that the temperature of the lower mold 22 has reached the set temperature, at least one footwear fabric which is selected from canvas, leather, breathable mesh fabric, and reflective fabric, together with the thermoplastic elastomer already available on the finished product area is placed onto the shoe upper template by a positioning-point alignment method and then covered by a silicon negative-pressure barrier 23 to keep air outside. Then a vacuum pump of the lower mold 22 starts working to remove residual air in the lower mold 22. Thereby the footwear fabric and the thermoplastic elastomer are stayed on the shoe upper template smoothly and stably. Next the lower mold 22 is moved under the upper mold 21 and then the upper mold 21 is raised to be aligned and connected with the lower mold 22. The upper and the lower molds 21, 22 keep heating the footwear fabric and the thermoplastic elastomer until the time set so that the footwear fabric and the thermoplastic elastomer are melted and adhered to each other at the temperature set to form the multi-layer composite footwear fabric 3 with the designed upper patterns. Later the upper mold 21 is raised automatically and the lower mold 22 is automatically returned to the original position for heat dissipation to be ready for demoulding. During an interval for heat dissipation of the lower mold 22, another lower mold 22 is automatically moved to repeat the steps mentioned above. Thus the production efficiency is improved by making use of the time for heat dissipation and mold release. Therefore, production capacity is increased up to 80% without increasing cost of more operators and purchase of machines. Once the time for heat dissipation of the lower mode 22 is up, use a high pressure air blow gun to cool down the silicon negative-pressure barrier 23. Lift the silicon negative-pressure barrier 23 and move the high pressure air blow gun in circles to cool down the multi-layer composite footwear fabric 3 continuously. After completing cool down, perform demolding. Pull the multi-layer composite footwear fabric 3 up slowly to release from the shoe upper template. After demolding, deliver the multi-layer composite footwear fabric 3 already adhered and formed to a laser machine to carry out the next step.

C. processing the shoe uppers: activate the laser machine to carry out processes including making holes for breathing, trimming burrs, cutting unnecessary waste, etc. and then deliver the finished multi-layer composite footwear fabric 3 to a printing machine for the next step.

D. printing the shoe uppers: turn on the printing machine and place the multi-layer composite footwear fabric 3 on a printing table of the printing machine to do printing. After printing, take the multi-layer composite footwear fabric 3 out to get the finished product.

Figure 4:
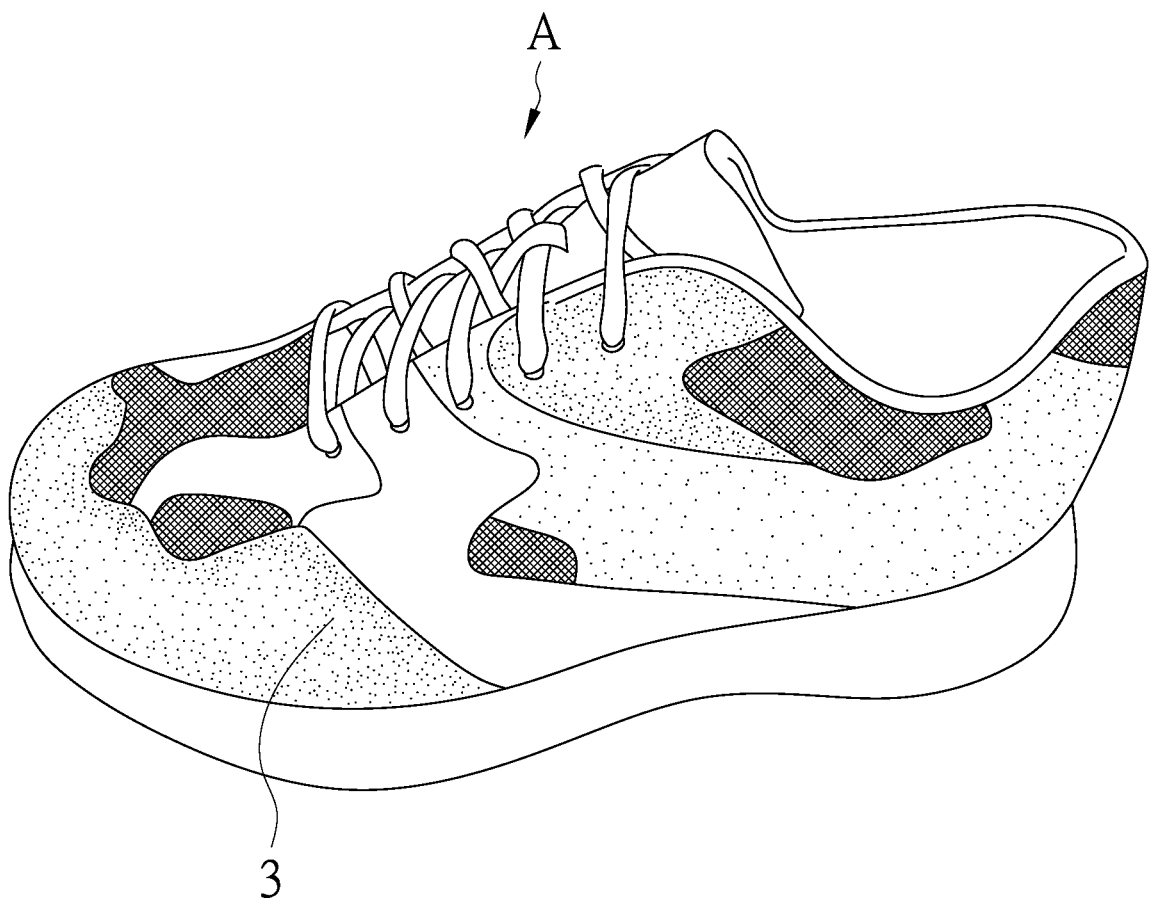
FIG. 4 is a schematic drawing showing a perspective view of a shoe produced of an embodiment according to the present invention.

Refer to FIG. 4, a shoe A is made by using the multi-layer composite footwear fabric 3 obtained by the respective steps mentioned above.

In summary, the present shoe upper manufacturing method has the following advantages compared with the techniques available now:

1. Without increasing steps and labor involved in the process, the manufacturing of the shoe upper made of single material is replaced by the manufacturing of the versatile multi-layer composite footwear fabric. Thus the optical use of the production equipment available now for many different purposes is achieved and able to meet different requirements of users on the market. At the same time, the yield rate of the product is improved, the production capacity is increased, and labor cost is reduced.
2. The present method not only can perform cutting and prepare various footwear fabric made from canvas, leather, breathable mesh fabric, reflective fabric, etc. for different purposes but also can sort the finished products from the waste material automatically for reducing manual operation time significantly and increasing production capacity effectively.
3. The interval for demolding can be used effectively by using one single upper mold in combination with a plurality of lower molds. Thus the production efficiency and capacity are both improved.
4. Due to the combination of one upper mold with a plurality of lower molds, the different lower molds together with the multi-layer composite footwear fabric made from combinations of various materials are used to form the shoe uppers in turn. At the same time, the multi-layer composite footwear fabric made from combinations of various materials is produced.
5. During the processes, the multi-layer composite footwear fabric for different purposes has different material properties so that the temperature and time required for melting and adhesion are different. Thus the heating temperature and time (parameters) of the upper mold and the lower molds are set respectively according to the combinations of the materials for the multi-layer composite footwear fabric. These parameters are set and saved in the control computer of the laser cutting machine in a modularized manner so that users only need to directly press preset memory modules for different combinations of materials during operation. Thereby human error during setting the related parameters can be avoided so that unnecessary material consumed and scrap generated in the production line are significantly reduced and unnecessary expenses are decreased. Moreover, the yield rate is improved and both the production capacity and gross margin are increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A shoe upper manufacturing method comprising the steps of:
    A. obtaining materials for shoe uppers: turning on a laser cutting machine and inserting a material roller of the laser cutting machine into a roll of footwear fabric and thermoplastic elastomer (TPE); then arranging a material conveyor over the material roller for delivery of the footwear fabric and the thermoplastic elastomer to a laser cutting platform; inputting a graphic file with designed upper patterns into a control computer of the laser cutting machine so that a laser head of the laser cutting machine cut through an inner diameter and an outer diameter of the footwear fabric and the thermoplastic elastomer; next sending footwear fabric and the thermoplastic elastomer being cut to a finished product area by a conveyor belt while residual waste is delivered to a garbage area by another conveyor belt;

B. forming the shoe uppers: activating a shoe upper forming machine which is provided with one upper mold and a plurality of lower molds and placing a shoe upper template on the lower mold; then setting heating temperature and time of the upper mold and those of the lower mold while heat of the lower mold is transferred to the shoe upper template during heating process; turning on an air compressor, placing the footwear fabric and the thermoplastic elastomer available on the finished product area onto the shoe upper template after confirming temperature of the lower mold has reached the set temperature, and covering a silicon negative-pressure barrier to keep air outside; then a vacuum pump of the lower mold starting working to remove residual air in the lower mold so that the footwear fabric and the thermoplastic elastomer are stayed on the shoe upper template smoothly and stably; moving the lower mold under the upper mold and carrying the upper mold down to be aligned and connected with the lower mold to make the upper and the lower molds keep heating the footwear fabric and the thermoplastic elastomer until the set heating time is up so that the footwear fabric and the thermoplastic elastomer are melted and adhered each other at the set heating temperature to form a multi-layer composite footwear fabric with designed upper patterns; then the upper mold is raised automatically and the lower mold is turned back to the original position automatically for heat dissipation to be ready for demoulding; during heat dissipation of the lower mold, another lower mold is automatically moved to repeat the steps mentioned above; cooling down the silicon negative-pressure barrier after heat dissipation of the lower mold and then lifting the silicon negative-pressure barrier for cooling down the multi-layer composite footwear fabric continuously; perform demoulding by pulling the multi-layer composite footwear fabric up slowly to release from the shoe upper template after cooling down; then delivering the multi-layer composite footwear fabric already adhered and formed to a laser machine to carry out the next step after the demoulding;

C. processing the shoe uppers: activating the laser machine to perform processes including making holes for breathing, trimming burrs, and cutting unnecessary waste and then delivering the finished multi-layer composite footwear fabric to a printing machine for the next step; and D. printing the shoe uppers: turning on the printing machine and place the multi-layer composite footwear fabric on a printing table of the printing machine to do printing and then taking the multi-layer composite footwear fabric out after the printing to get a finished product.

2. The method as claimed in claim 1, wherein the footwear fabric is selected from the group consisting of canvas, leather, breathable mesh fabric, reflective fabric, and a combination thereof.

3. The method as claimed in claim 1, wherein the shoe upper forming machine is a machine which performs microporous low-temperature sintering and vacuum heat transfer printing.

4. The method as claimed in claim 1, wherein the shoe upper template on the lower mold is able to be replaced by other shoe upper templates with different upper patterns.

5. The method as claimed in claim 1, wherein a thermometer is used to check whether a temperature of the lower mold has reached the set temperature in the step B.

6. The method as claimed in claim 1, wherein footwear fabric and the thermoplastic elastomer are placed onto the shoe upper template by a positioning-point alignment method in the step B.

7. The method as claimed in claim 1, wherein a high pressure air blow gun is used to cool down the silicon negative-pressure barrier in the step B.

8. The method as claimed in claim 1, wherein a high pressure air blow gun is moved in circles to cool down the multi-layer composite footwear fabric continuously in the step B.

* * * * *